United States Patent [19]
DeLano et al.

[11] 3,940,767

[45] Feb. 24, 1976

[54] ELECTRONIC RADOME-ERROR COMPENSATION SYSTEM

[75] Inventors: Richard H. DeLano; Warren E. Mathews, both of Los Angeles; Edgar L. Armi, Palos Verdes Estates; Keith W. Cochran, Los Angeles, all of Calif.

[73] Assignee: Hughes Aircraft Company, Culver City, Calif.

[22] Filed: Jan. 21, 1955

[21] Appl. No.: 483,206

[52] U.S. Cl. .............................. 343/16 R; 343/872
[51] Int. Cl.² .................... G01S 9/02; H01Q 1/42
[58] Field of Search ............ 343/18, 872, 16 R, 5 R

[56] References Cited
UNITED STATES PATENTS

3,128,466  4/1964  Brown et al. .................. 343/872 X

*Primary Examiner*—Richard A. Farley
*Assistant Examiner*—Gregory E. Montone
*Attorney, Agent, or Firm*—James K. Haskell; Noel B. Hammond

EXEMPLARY CLAIM

1. In a radar-controlled system including a radome-covered antenna adapted to receive a radar beam and to develop direction signals in accordance with the direction of said received beam, and an electronic receiver adapted to receive and convert said direction signals derived from said antenna to develop output signals in a predetermined manner, wherein said radome-covered antenna subjects said beam to radome-error, and wherein said radome-error is functionally related to the offset angle of said beam, an electronic radome-error compensating system comprising: means coupled to said radar-controlled system and responsive to said direction signals for developing a signal representative of said offset angle of said beam, a function generator coupled to said means for receiving information indicative of said offset angle, and a compensation input terminal in said radar-controlled system, said function generator being coupled to said input terminal and adapted to generate a compensating signal which is at all times the negative replica of the effective radome-error contribution to said direction signals as related to the position of said input terminal, whereby said compensating signals are added to said direction signals, thereby rendering said output signals substantially independent of said radome-error.

13 Claims, 12 Drawing Figures

INVENTORS.
RICHARD H. DELANO,
WARREN E. MATHEWS,
EDGAR L. ARMI,
KEITH W. COCHRAN,
BY
Henry Heyman
ATTORNEY.

INVENTORS.
RICHARD H. DELANO,
WARREN E. MATHEWS,
EDGAR R. ARMI,
KEITH W. COCHRAN,
BY Henry Heyman
ATTORNEY.

ELECTRONIC RADOME-ERROR COMPENSATION SYSTEM

This invention relates to radar-controlled guidance systems for aircraft and more particularly to a system which electronically compensates such a guidance system for the effects of directional errors suffered by the microwave guidance signal in traversing a radome which covers the receiving antenna.

When an antenna is enclosed in a radome, the apparent line of sight, defined as the direction of zero error signal of the radar-controlled guidance system, generally does not coincide with the true line of sight. The angle between the apparent and the true lines of sight is called the radome-error angle or simply the radome-error. It should be noted that the radome-error, as defined above, is not a characteristic of the radome alone, but rather depends upon the complex electromagnetic interactions of the complete housing system including the radome and the antenna.

One of the more serious problems encountered in radar-controlled guidance systems, having a radome-covered antenna, has been the development of a satisfactory radome. Apart from certain strength and temperature requirements, the radome design is largely a compromise between aerodynamic and electromagnetic performance. A long, slender, pointed radome is optimum aerodynamically, but cannot readily be made to have good electromagnetic performance, that is, it has a relatively large radome-error. With a blunt radome, acceptable electromagnetic performance can be more readily achieved, but the high drag due to a blunt radome seriously reduces the aerodynamic performance of the aircraft.

Constant research and improvements have led to the development of radomes which have vastly improved electromagnetic characteristics for optimum aerodynamic shapes. However, such improvements are partly restricted to radomes which are large in comparison to the width of the microwave beam to be received. If the beam width is such that it passes through a considerable portion of the radome, the imperfections presented to the passage of the beam, some of which are not entirely due to the radome itself, are still a serious problem.

In some applications, the radome-error angle itself is of direct importance. On the other hand, many radar-controlled guidance systems are designed to be responsive not to the absolute orientation of the line of sight, but rather to the rate at which that orientation is changing. Correspondingly, in such systems, it is not primarily the radome-error itself which affects the navigation, but rather the rate of change of the radome-error with change in orientation of the line of sight relative to the coordinates of the guidance system. In a radar-controlled guidance system which provides proportional navigation, for example, it can be shown that the result of the radome-error derivatives is such as to introduce three major kinds of undesirable effects: first, it may tend to make the system unstable; second, it affects the navigation constant; and third, it may produce a marked increase in the response to scintillation noise.

The prior art, in combating such consequences of radome-error, has concentrated on minimizing radome-error itself by attempting with various degrees of success to manufacture more perfect radomes. However, no attempt has been made to meet this problem by an electronic compensation scheme.

It is therefore an object of this invention to reduce or to eliminate the effects of radome-error in a radar-controlled guidance system by the introduction of electronic radome-error compensating signals.

It is also an object of this invention to electronically compensate, jointly or severally, any parameters which, as a consequence of radome-error derivatives, produce or tend to produce a material deterioration of the performance of the radar-controlled guidance system.

It is another object of this invention to electronically compensate the steering signals of a radar-controlled guidance system for the effects caused by radome-error.

It is a further object of this invention to relax the usual stringent requirement on radomes, such as specifications calling for extremely small radome-error angles or their derivatives, by electronically compensating those parameters of the guidance system which would otherwise tend to materially deteriorate performance of the radar-controlled guidance system.

For the purpose of this invention, it is essential that the particular kind of radome-error for which compensation is desired not be of a random nature. In other words, if the particular signal for which compensation is desired depends solely on the input error angle, it is essential that the radome-error angle be either constant or some function of the angle between the radome axis and the line of sight and also, for most practical applications, independent of the azimuth angle. If the particular signal for which compensation is desired depends solely on the rate of change of the input error angle, it is essential that the first derivative of the radome-error with respect to changes of the angle of the line of sight be either constant or some function of the angle between the radome axis and the line of sight and, for most practical applications, independent of the azimuth angle. The same is true for higher derivatives of the radome-error in systems which are sensitive to higher derivatives of the input error angle.

This invention contemplates the introduction of an electronic compensating voltage into the radar-controlled guidance system at a suitable point to reduce or to eliminate the effects produced by radome-errors, which, in the absence of such compensation, would produce a serious guidance defect in the system. If the defect of the system depends on the radome-error angle, a voltage is introduced whose magnitude and whose sign correspond, to some scale, to the magnitude and sign of the radome-error angle in the neighborhood of the line of sight. If the defect of the system depends on the radome-error derivative, a voltage is introduced whose magnitude and sign correspond, to some scale, to the magnitude and sign of the derivative of the radome-error with respect to the line of sight in the neighborhood of the line of sight, multiplied by the time-rate of change of the angle between the radome axis and the line of sight.

The novel features which are believed to be characteristic of the invention, both as to its organization and method of operation, together with further objects and advantages thereof, will be better understood from the following description considered in connection with the accompanying drawings, made a part of this specification, in which several embodiments of the invention are illustrated by way of example.

Figure 1:
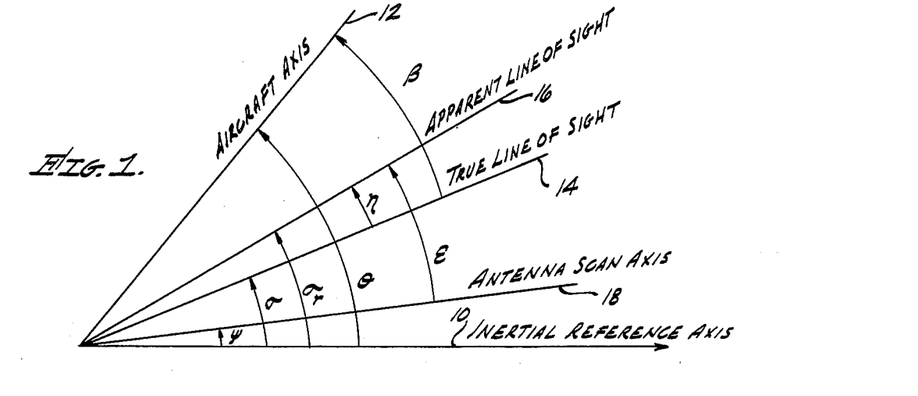
FIG. 1 is a coordinate system and defines symbols for various angles which will be used in the specification of this invention.

For the purpose of explaining this invention, FIG. 1 defines the angles employed using an inertial reference axis 10, fixed in space, as the base line. The axis 12 is the center line of the aircraft and makes an angle $\theta$, called the aircraft axis angle, with the inertial reference axis 10. In almost all aircraft configurations the axis of the radome covering the antenna is coincident with the aircraft axis 12. The true line of sight 14 indicates the actual position of the target and forms an angle $\sigma$, called the line of sight angle, with the inertial reference axis 10. If the aircraft is equipped with a radome which covers the antenna of the aircraft and if the radome-antenna combination exhibits imperfect microwave transmission characteristics, the true line of sight 14 will deviate through an angle $\eta$ to become the apparent line of sight 16. The apparent line of sight 16 makes an angle $\sigma_r$, called the apparent line of sight angle, with the inertial reference axis 10, and the angle $\eta$ between the apparent line of sight 16 and the true line of sight 14 is called the radome-error angle. The angle between the true line of sight 14 and the aircraft axis 12 is $\beta = \theta - \sigma$, the offset angle.

If the aircraft is equipped with an antenna such as a scanning antenna having an axis stabilized by a gyroscope and which does not coincide with the aircraft axis, then the antenna scan axis 18 makes an angle $\psi$, called the scan axis angle, with the inertial reference axis 10. The angle between the antenna scan axis 18 and the apparent line of sight 16 is $\epsilon = \sigma_r - \psi$, the error angle.

Figures 2, 3:
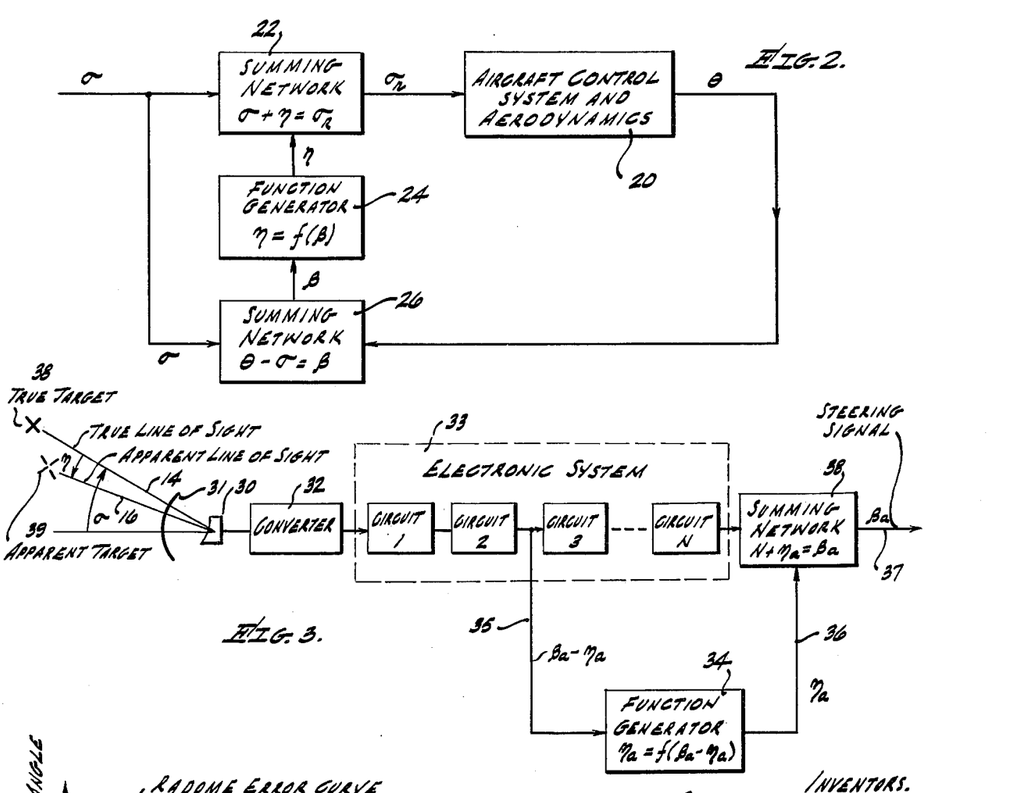
FIGS. 2, 5 and 9 are block diagrams to aid in explaining the presence and effect of radome-error as pertaining to guided aircraft.
FIG. 3 is a schematic block diagram of a simple radar-controlled system provided with electronic radome-error compensation in accordance with this invention.

FIG. 2 shows a simple explanatory block diagram illustrating the character, effect and location of radome-error as experienced in flight by an aircraft control system and aerodynamics. The particular block diagram shown serves to elucidate the case where radome-error appears as an angular deviation which does not suffer differentiations or integrations.

The aircraft control system and aerodynamics 20 has an input $\sigma_r$, the apparent line of sight angle, and an output, $\theta$, the aircraft axis angle. Since the apparent line of sight angle, $\sigma_r$, in accordance with FIG. 1 can be regarded as made up of the true line of sight angle, $\sigma$, and the radome-error angle, $\eta$, it is possible to assume the existence of a summing network 22 having the input signals $\sigma$ and $\eta$ which are added to form the output $\sigma_r$. As mentioned above, this electronic radome-error compensation in accordance with the present invention is feasible if the type of radome-error bears, at least substantially, a functional relationship to the offset angle $\beta$ so that $\eta = f(\beta)$.

Let a function generator 24 represent the radome-error generator so that it has an output signal corresponding to the radome-error angle $\eta$ which is impressed upon the summing network 22 and an input signal corresponding to the offset angle $\beta$. Since $\beta$, as defined in FIG. 1, is equal to the aircraft axis angle minus the true line of sight angle or $\theta - \sigma$, it is possible to assume a second summing network 26 having the input signals corresponding to the aircraft axis angle $\theta$ and $\sigma$, these input signals being subtracted to develop the output signal corresponding to the offset angle $\beta$. As can be seen from FIG. 2, the two input signals to the summing network 26 are the same as the input to summing network 22 and the output of the aircraft control system and aerodynamics 20. It is therefore feasible to construct the loops as shown in FIG. 2 which illustrate the character of the radome-error and its effect on the overall system.

FIG. 2, therefore, shows that a radar-controlled guidance system for aircraft which is responsive to the absolute line of sight angle, $\sigma$, can be made independent of radome-error by merely introducing into the summing network 22 an electronic radome-error compensation signal corresponding to the negative value of the radome-error angle $\eta$.

FIG. 3 is a schematic block diagram of the input stage of a simple radar system which is responsive to the absolute line of sight angle, $\sigma$, forming the input signal, and which develops a steering signal as an output signal obtained from output lead 37. A fixed antenna 30 is covered with a radome 31 through which the antenna looks at the true target 38. The target 38 is located along the true line of sight 14 but due to radome error or other imperfections in the radome-antenna combination, the antenna sees an apparent target 39 along the apparent line of sight 16, displaced by the radome-error angle, $\eta$, from the true line of sight 14. The signal output from the antenna 30 is therefore proportional to $\sigma_r = \sigma + \eta$ and is passed through a microwave converter 32 to the electronic system 33 which develops as an output the steering signal which may be obtained from output lead 37. The electronic system 33 may be considered as being made up of a number of receiver circuits in cascade, say N circuits. A function generator 34 having an input lead 35 and an output lead 36 is connected to the input stage of the radar system in any convenient manner. FIG. 3 shows the input lead 35 connected between circuit No. 2 and circuit No. 3, and the output lead 36 connected to a summing network 38 located at the output of the circuit No. N. The summing network 38 adds the output signal from the function generator 34 to the output signal "N" of the circuit No. N. The points of interconnection for the loop including function generator 34 are to be determined almost solely by the convenience of removing an input lead 35 from and inserting a summing network 38 into the radar system.

The operation of the electronic radome-error compensation system can best be explained by referring again to FIG. 2. As shown there, the randome-error $\eta$ can be thought of as being introduced into the summing network 22, and is functionally dependent on the offset angle $\beta$. The function generator 34 of FIG. 3 is a computer which computes the amount of radome-error corresponding to the position of the radome through which the true line of sight passes, namely, the offset angle. Therefore, all that is necessary is to supply to the function generator 34 of FIG. 3 an input signal proportional to $\beta_a$ and to inject its output signal $\eta_a$ into the electronic system after providing for the same amplification which the radome-error has suffered in reaching the point at which the radome-error compensation is inserted. Whenever electric signals corresponding to angles are described, the electrical quantities are denoted by the appropriate angle symbols having a subscript $a$.

Since the error angle $\sigma$ to which the system is subjected is equal to the negative of the offset angle $\beta$, the antenna being fixed along the radome axis, the signals developed at any point in the electronic system are a measure of this offset angle. A signal representative of the offset angle can therefore be abstracted from the system at any convenient place and supplied to the function generator 34. Also, the radome-error angle $\eta$ is small and therefore relatively unimportant compared to the offset angle $\beta$, so that for all practical purposes it is immaterial whether the input to the function generator 34 is proportional to the angle $\beta$ or to the angle $\beta-\eta$, $(\beta>>\eta)$.

In the absence of the electronic radome-error compensation system the steering signals will not be representative of the true line of sight angle $\sigma$ but rather of the apparent line of sight angle $\sigma + \eta$. The output of the function generator 34 is $\eta_a$, the electronic radome-error compensation signal. The effect of introducing the signal $\eta_a$ is such as to make the steering signals proportional to the true line of sight angle $\sigma$ and therefore independent of the radome-error.

Principally, there are two ways of connecting the function generator 34 to the electronic system 33; namely, either to put the function generator input lead 35 ahead of the output lead 36 or vice versa. If the function generator 34 is connected with the output lead 36 ahead of the input lead 35, a regenerative feedback loop results which may cause stability problems. For this reason it is generally preferred to derive the input to the function generator 34 from the electronic system 33 at a point ahead of that at which the output of the function generator 34 is injected into the system shown in FIG. 3.

Figure 4:
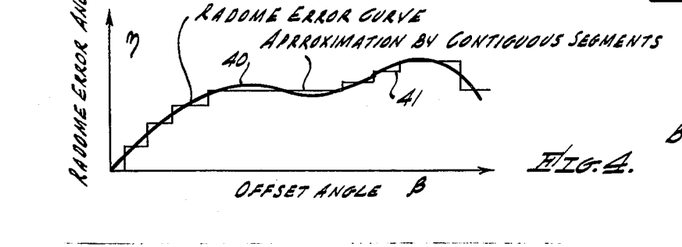
FIG. 4 is a graph showing a typical relation as found to exist between the radome-error and the offset angle.

The function generator 34 used to generate the electronic radome-error compensation signal may be one of many well known in the prior art. (See "Waveforms", M.I.T. Radiation Laboratory Series, Vol. 19, p. 293, by Chance, Hughes, MacNichol, Sayre and Williams, McGraw-Hill Book Company, Inc., New York, N.Y. 1949), discussing the staircase waveform approximation.) A typical curve of radome-error $\eta$ versus offset angle $\beta$ is shown in FIG. 4. This curve 40 may be approximated by a staircase waveform 41 as illustrated in FIG. 4 to any desired degree of accuracy. One example of generating a staircase waveform is accomplished by utilizing a computer using diodes to approximate, by a sequence of contiguous straight line segments, the curve 40 of radome error $\eta$ with respect to the offset angle $\beta$. Another way of realizing such a function generator would be the use of one or more potentiometers driven by a Selsyn motor. The summing network 38 of FIG. 3 is likewise well known in the prior art. (See "Waveforms", M.I.T. Radiation Laboratory Series, Vol. 19, p. 629, by Chance, Hughes, MacNichol, Sayre and Williams, McGraw-Hill Book Company, Inc., New York, N.Y. 1949).

The large majority of radar-controlled guidance systems for aircraft develop steering signals proportional to the time-rate of change of the line of sight angle, $\sigma$, even though the input is the line of sight angle $\sigma$. This is accomplished by the differentiation action of the input stage of the radar-controlled guidance system called the tracking loop. In order to achieve electronic radome-error compensation in such a system, it is necessary to determine how radome-error affects such a system.

Figure 5:
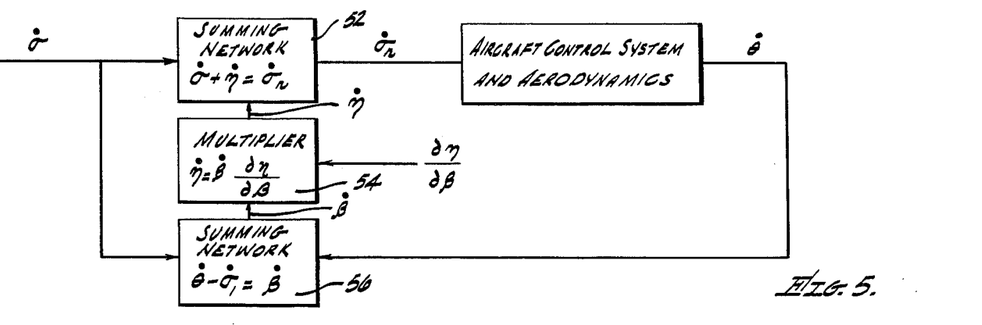

FIG. 5 is a simple illustrative block diagram, of the type shown in FIG. 2, of a radar-controlled guidance system for aircraft responsive to the time-rate of change of the line of sight angle, $\dot{\sigma}$. The aircraft control system and aerodynamics 50 has an input signal $\dot{\sigma}_r$, the time-rate of change of the apparent line of sight, and an output $\dot{\theta}$, the time-rate of change of the aircraft axis angle. Since $\sigma_r$ in accordance with FIG. 1 is equal to the radome-error angle added to the true line of sight angle, or $\sigma + \eta$, the time-rate of change of $\sigma_r$ is equal to $\dot{\sigma} + \dot{\eta}$. Therefore, a summing network 52 may be assumed as shown in FIG. 5 having input signals $\dot{\sigma}$ and $\dot{\eta}$ and an output signal $\dot{\sigma}_r$. Let a multiplier network 54 be assumed which has an output which represents the radome-error as suffered by the system, namely $\dot{\eta}$, which is impressed upon the assumed summing network 52. Since $$\dot{\eta} = \frac{2\eta}{2\beta} \times \frac{2\beta}{2t}$$

and $$\frac{2\beta}{2t} = \dot{\beta} = \dot{\theta} - \dot{\sigma}$$

in accordance with FIG. 1, the quantity $\dot{\eta}$ which represents the time-rate of change of the radome-error angle can be written as $$\frac{2\eta}{2\beta}(\dot{\theta} - \dot{\sigma}) = \frac{2\eta}{2\beta} \times \dot{\beta}.$$

Therefore, to obtain the desired output signal from the assumed multiplier 54, two input signals can be provided; namely ($\delta\eta/\delta\beta$), which is the slope of the radome-error angle $\eta$ plotted against the offset angle $\beta$, and the time-rate of change of the offset angle $\dot{\beta} = \dot{\theta} - \dot{\sigma}$. The quantity ($\delta\eta/\delta\beta$) must either be computed by a suitable function generator or, if substantially constant, can be inserted as indicated in FIG. 5 as a constant voltage. In the latter case, the assumed multiplier 54 may be replaced by an assumed amplifier having a constant amplification equal to $\delta\theta/\delta\beta$. A second summing network 56 may now be assumed as shown in FIG. 5 having input signals $\dot{\theta}$ and $\dot{\sigma}_r$, these input signals being subtracted from one another by the summing network 56 to develop an output signal $\dot{\beta}$. These two input signals, as seen from FIG. 5, are the output signal of aircraft control system and aerodynamics 50 and the input signal of the assumed summing network 52. Consequently, two loops as shown in FIG. 5 may be formed which illustrate how radome-error affects the radar-controlled guidance system for aircraft which is responsive to the time-rate of change of the line of sight angle.

It is therefore seen that a radar-controlled guidance system for aircraft which is sensitive to the time-rate of change of the line of sight angle can be made independent of radome-error by introducing into the assumed summing network 52 an electronic radome-error compensation signal equal and opposite to the quantity $\dot{\eta}$.

Figure 6:
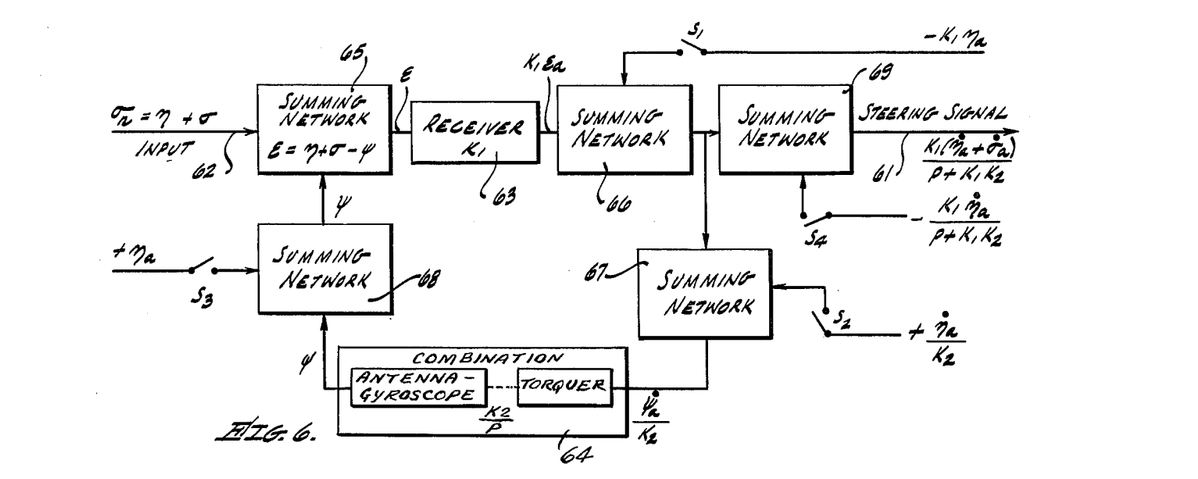
FIG. 6 is a schematic block diagram of the tracking loop portion of a radar-controlled guidance system for aircraft showing possible ways of introducing electronic radome-error compensation into the system for the purpose of explaining this invention.

FIG. 6 is a schematic block diagram to illustrate four possible ways of introducing electronic radome-error compensation into the tracking loop of a typical radar-controlled guidance system for aircraft. The tracking loop is a portion of the guidance system and comprises a closed-loop servo-system whose behavior is continuously a function of the error angle, i.e., whose output is a function of the difference between the line of sight angle and the scan axis angle. The tracking loop develops a steering signal derived from output lead 61 proportional to the time-rate of change of the line of sight angle, $\dot{\sigma}$, and has an input lead 62 upon which is impressed the apparent line of sight angle $\sigma_r = \eta + \sigma$. The tracking loop essentially comprises a forward path and a feedback path, the forward path including a receiver 63 having a transfer function $K_1$, $K_1$ being a constant and the feedback path including the antenna-gyroscope-torquer-combination 64 acting as an integrator having a transfer function $(K_2/P)$, $K_2$ being a constant. The output of the feedback path of the tracking loop is connected to a summing network 65 which substracts from the input signal $\sigma_r$, the feedback signal $\psi$ from the antenna-gyroscope-torquer-combination 64. The output of the summing network 65 is the error angle signal $\Sigma$ which is the input to the receiver 63. In other words, the summing network 65 has two input signals, one of which is a guidance signal in the form of the apparent line of sight angle $\sigma_r = \eta + \sigma$, and the other of which is the feedback signal in the form of the antenna scan axis signal $\psi$. Therefore, it would appear that the system is responsive to the line of sight angle, $\sigma_r$, but by virtue of the fact that the antenna-gyroscope-torquer-combination 64 is an integrator and precesses the antenna axis so as to align itself with the apparent line of sight, the output of the tracking loop is actually responsive to the time-rate of change of the line of sight angle $\dot{\sigma}_r$.

In order to make the radar-controlled guidance system independent of radome-error and keeping in mind that the input signal to the summing network 65 always includes the radome-error angle $\eta$, means and ways have to be found to remove from the steering signal the time-rate of change of the error angle $\dot{\eta}$.

By analysis of the tracking loop of FIG. 6, it can be shown that by introducing a compensating voltage at a specified point in the tracking loop, the steering signal can be made substantially independent of the radome-error contribution. For example, a signal $-K_1\eta_a$ may be impressed upon a summing network 66 and added to the receiver output voltage by closing switch $S_1$, where said summing network 66 is inserted into the forward path of the tracking loop behind the receiver 63. A second way to substantially eliminate radome-error is to impress a signal $(\dot{\eta}_a/K_2)$ upon a summing network 67 so that it may be added to the signal in the feedback path by closing switch $S_2$, where said summing network 67 is inserted into the feedback path ahead of the antenna-gyroscope-torquer-combination 64. A third way of rendering the steering signal substantially independent of radome-error is to impress a signal $\eta_a$ upon a summing network 68 so that it may be added to the output signal of the feedback path by closing switch $S_3$, where said summing network 65 is inserted into the feedback path ahead of the summing network 65. A further way of accomplishing the desired result is to impress a signal $$\frac{K_1\dot{\eta}a}{P + K_1 K_2}$$

upon a summing network 69 so that it may be subtracted directly from the steering signal by closing switch $S_4$, where said summing network 69 is inserted into the output of the tracking loop.

Consequently, for the system shown in FIG. 6, any one of the four ways mentioned will result in effective electronic radome-error compensation. The choice of any particular way of achieving such compensation is determined by two factors; first, the convenience of impressing a signal into a particular part of the system, and second, the relative ease of generating the required signal.

Figure 7:
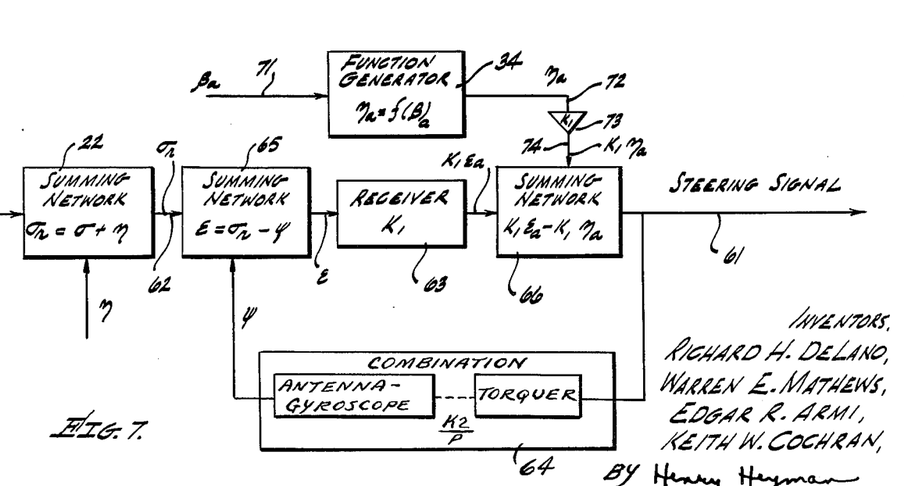
FIGS. 7, 8, 10, 11 and 12 are schematic block diagrams of the tracking loop portion of a radar-controlled guidance system for aircraft showing different embodiments for generating and introducing electronic radome-error compensation into the system in accordance with FIG. 6 of this invention.

FIG. 7 is a block diagram showing a specific embodiment of this invention for achieving electronic radome-error compensation. This embodiment provides for the insertion of the electronic compensating signal into the forward path of the tracking loop as indicated in FIG. 6 by closing the switch $S_1$. The tracking loop shown in FIG. 7 is the same as the one shown and described in conjunction with FIG. 6. The input signal to the tracking loop, namely $\sigma_r$, obtained from lead 62, can be regarded as the output of the summing network 22 which was shown and described in conjunction with FIG. 2, having two inputs, namely, the true line of sight angle, $\sigma$, and the radome error angle, $\eta$. The compensation signal necessary to cancel out the radome-error contribution is, as shown in FIG. 6, equal to $K_1\eta_a$ and must be impressed upon the summing network 66 which is designed to subtract the compensating signal $K_1\eta_a$ from the output signal $K\epsilon_a$ of the receiver 63.

A function generator 34, shown and described in conjunction with FIG. 3, has an input lead 71 and an output lead 72 which is connected to an amplifier 73. The amplifier 73 provides a constant amplification equal to $K_1$ which is the same as that of the receiver 63. The output lead 74 of the amplifier 73 is connected to the summing network 66 and provides the compensating signal $K_1\eta_a$. The input to the function generator 34 is a signal corresponding to the offset angle $\beta$. The function generator 34 then computes the radome-error signal, $\eta_a$, according to $\eta_a = f(\beta_a)$ as mentioned above.

One problem experienced with this particular kind of electronic radome-error compensation system is that of obtaining the input signal $\beta_a$. If the system is sensitive to the time-rate of change of the line of sight angle as here, the guidance system has no knowledge of the offset angle $\beta$, and it is therefore impossible to obtain an indication of the offset angle $\beta$ from the electronic signals in any part of the system. This situation is experienced if we deal with a radar-controlled guidance system having an antenna-gyroscope-torquer-combination whose scan axis is constantly precessed to coincide with the line of sight. In such a case, it has been found feasible to attach a potentiometer or a reluctance pickoff to the antenna-gyroscope which will at any time give an indication of the angle $\theta - \psi$ an angle usually very close to the offset angle $\beta$ for the reason that $\delta$ will constantly tend to zero. It is thereby possible to extract the offset angle $\beta$ from the radar-controlled guidance system, making use of an auxiliary pickoff device. If the radar-controlled guidance system has knowledge of the offset angle $\beta$, the offset angle then may be extracted from the guidance signals in any part of the aircraft control system and aerodynamics as shown in FIG. 2.

Figure 8:
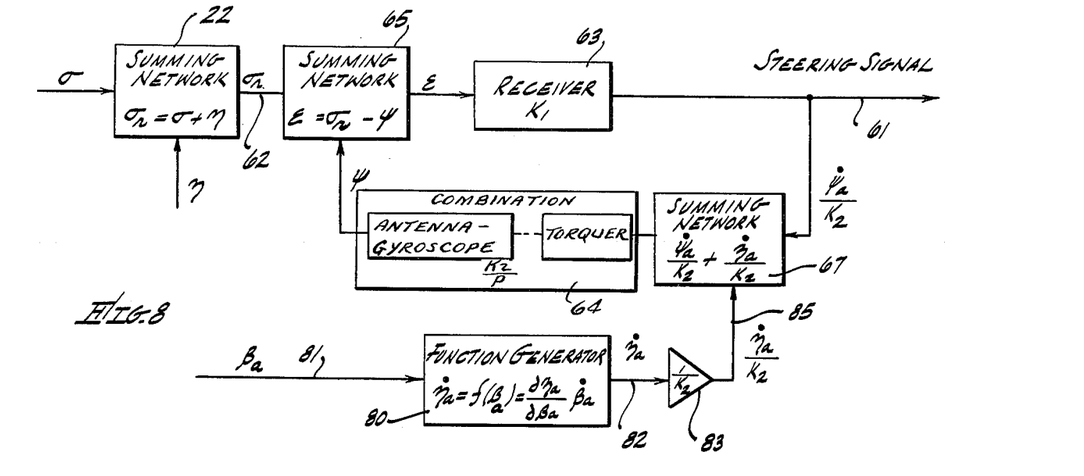

FIG. 8 is another block diagram showing a specific embodiment for achieving electronic radome-error compensation. This embodiment provides for the insertion of the compensating signal into the feedback path of the tracking loop as shown and described in FIG. 6 by closing the switch $S_2$. The tracking loop shown in FIG. 8 is the same as the one shown and described in conjunction with FIGS. 6 and 7. The compensation signal necessary to cancel out the randome-error contribution is, as indicated in connection with FIG. 6, equal to $(\dot{\eta}_a/K_2)$ and must be impressed upon the summing network 67 which is designed to effect the addition of the compensating signal to the feedback signal. A function generator 80 having an input lead 81 and designed to compute the time-rate of change of the randome-error angle $\dot{\eta}$ has its output lead 82 connected to an amplifier 83. The amplifier 83 provides a constant amplification equal to $(1/K_2)$ which is the inverse of that of the antenna-gyroscope torquer-combination 64. The amplifier 83 has its output lead 85 connected to the summing network 67 and provides the compensation signal $(\dot{\eta}_a/k_2)$.

The remarks made in the description of FIG. 7 concerning the availability of an input signal to the function generator 71 corresponding to the offset angle $\beta$ are applicable here also. In addition, a further problem has to be considered in conjunction with the particular kind of a function generator shown in FIG. 8; namely, the requirement of a smooth and continuous input signal corresponding to the offset angle $\beta$, capable of being differentiated. For this reason, it is desirable to attach reluctance pickoffs to the antenna-gyroscope in preference to utilizing potentiometers.

Figure 9:
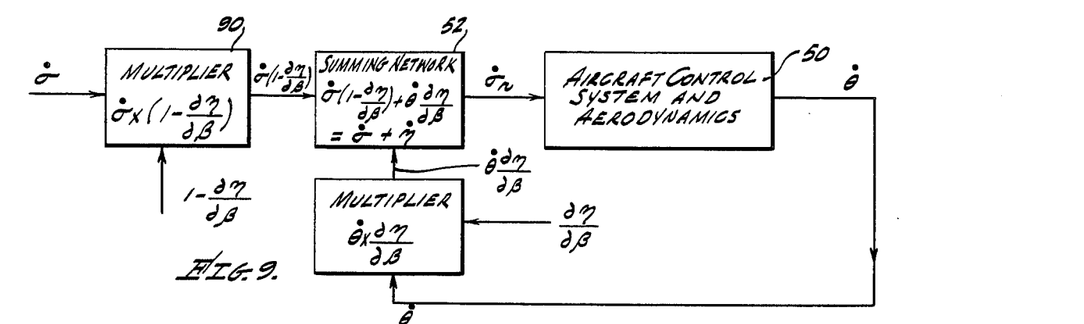

FIG. 9 is another illustrative block diagram of the type shown and described in conjunction with FIG. 5 but where the summing network 56 has been eliminated with the aid of a transformation, thereby removing one of the two loops shown therein. To make the block diagrams depicted in FIG. 9 and FIG. 5 equivalent, it is only necessary to insert a multiplier 90, the output of which is connected to the summing network 52. Two input signals are impressed upon the multiplier 90; namely, the time-rate of change of the line of sight, $\dot{\sigma}$, and the quantity $$1 - \frac{2\eta}{2\beta},$$

where the $(\delta\eta/\delta\beta)$ is the slope of randome-error angle with respect to the offset angle. Except for the elimination of summing network 56 and the addition of multiplier 90, the description given in conjunction with FIG. 5 is applicable here also.

The reason for such a presentation becomes apparent when $\dot{\beta}$ is split up into its components; namely $\dot{\sigma} + \dot{\theta}$. Since it is at times desirable to achieve electronic randome-error compensation without the use of a function generator computing the quantity $\dot{\beta}$, it is desirable to determine what approximations could be made to simplify the electronic error compensation system. Since $(\delta\eta/\delta\beta)$ is usually small compared with unity, it is permissible to approximate $$1 - \frac{2\eta}{2\beta}$$

as unity. Therefore, the randome-error contribution to the system may be substantially compensated for by inserting the negative value of $$\dot{\theta} \frac{2\eta}{2\beta}$$

into the summing network 52.

As a consequence of this approximation, it is possible to obtain electronic randome compensation by using a function generator which merely computes the randome-error angle derivative with respect to the offset angle $\beta$ for a particular offset angle. The output signal of this function generator is then multiplied with the time-rate of change of the aircraft axis angle and injected into the tracking loop to achieve satisfactory electronic radome-error compensation. It is very much easier to obtain the quantity $\dot{\theta}$ from a radar-controlled guidance system by means of rate gyroscopes than it is to obtain the quantity $\dot{\beta}$. Furthermore, it has been found that for most applications the randome-error derivative $(\delta\eta/\delta\beta)$ may be regarded as a constant. In such a case, it is then possible to achieve effective randome-error compensation without using a function generator at all, but instead, to generate the quantity $\dot{\theta}$ from a rate gyroscope and inject this quantity in the tracking loop after necessary amplification occasioned by the constant slope $(\delta\eta/\delta\beta)$.

Figure 10:
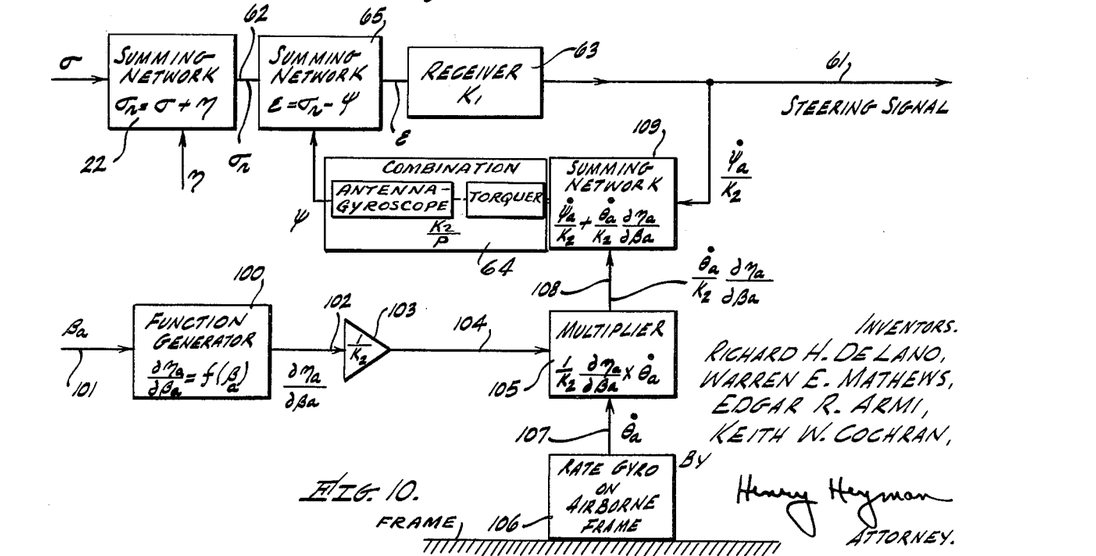

FIG. 10 is a block diagram showing another embodiment of this invention of obtaining substantial electronic randome-error compensation. This embodiment provides for the insertion of the compensating signal into the feedback path of the tracking loop as shown and described in conjunction with FIG. 8. The difference between this embodiment and that of FIG. 8 is that here the approximation suggested in conjunction with the description of FIG. 9 is used to obtain substantial electronic radome-error compensation while in the latter, essentially complete radome-error compensation was attempted.

The tracking loop including the summing network 65 shown in FIG. 10 has been fully described in conjunction with the description of FIG. 8. The compensation signal added to the feedback signal to achieve substantial electronic randome-error compensation is changed from $(\dot{\eta}_a/k_2)$ of FIG. 8 to $$\frac{\dot{\theta}_a}{K_2} \frac{2\eta_a}{2\beta_a}.$$

A function generator 100 having an input lead 101 is designed to compute the quantity $(\delta\eta_a/\delta\beta_a)$, and has its output lead 102 connected to an amplifier 103 which provides the constant amplification $(1/K_2)$, as mentioned in conjunction with FIG. 8. The output 104 of the amplifier 103 is connected to a multiplier 105. A rate gyroscope 106 fastened to the air frame and capable of measuring the time-rate of change of the guided aircraft axis has an output lead 107 from which is obtained $\dot{\theta}$ and which is also connected to the multiplier 105. The multiplier 105 forms the desired product $$\frac{\dot{\theta}_a}{K_2} \quad \frac{2\eta_a}{2\beta_a}$$

by multiplying the two inputs obtained from leads 104 and 107 and has an output lead 108 connected to the summing network 109 for impressing upon the summing network the desired approximation of the electronic randome-error compensating signal which is added to the feedback signal of the tracking loop. The input lead 101 to the function generator 100 has impressed upon it a signal corresponding to the offset angle $\beta$ from the radar-controlled guidance system as discussed in connection with FIGS. 7 and 8. The system described here has a considerable advantage over the system described in conjunction with FIG. 8 in that electronic differentiation of $\beta$ with respect to time is not required. This makes possible the employment of a more simplified function generator and avoids the necessity of obtaining a smooth electrical signal representing the offset angle $\beta$.

Figure 11:
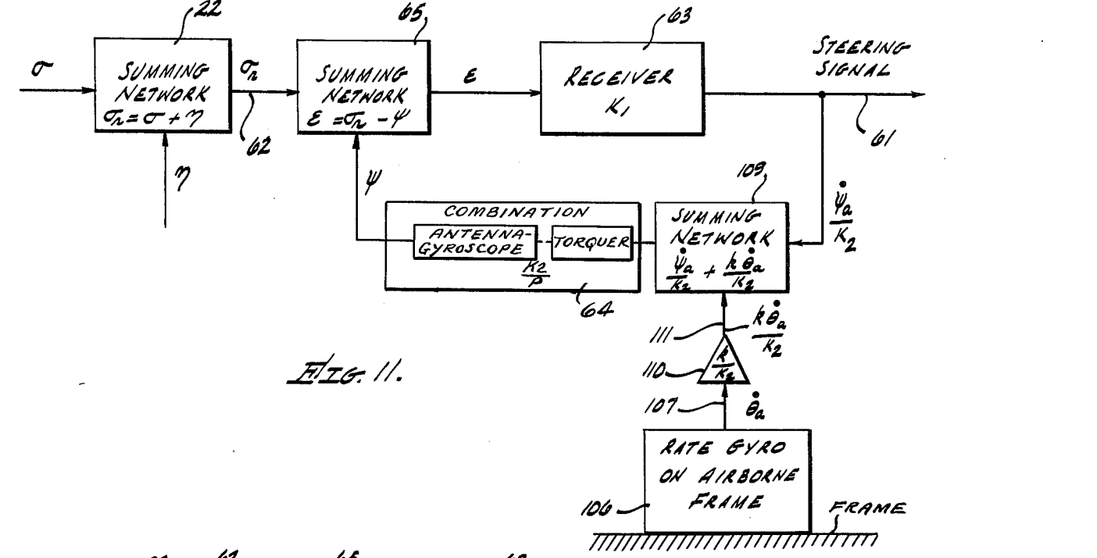

FIG. 11 is a block diagram showing a further embodiment of the electronic radome-error compensating system of this invention similar to that discussed in conjunction with FIG. 10. A second approximation is made in order to obtain still further simplification. The description of the tracking loop and of the summing network 109 shown in FIG. 11 is identical to that discussed in conjunction with that of FIG. 10 except for the method of generating the compensation signal. The second approximation is obtained if $(\delta\eta/\delta\beta)$ can be treated as substantially constant which is usually the case. It then becomes unnecessary to employ a function generator 100 at all which in turn eliminates entirely the necessity of providing a signal representative of the offset angle 62. It further eliminates the necessity of using the multiplier 105. In this case, electronic randome-error compensation can be achieved by employing a rate gyroscope 106 fastened to the air frame and having an output signal equal to $\dot{\theta}_a$. This output signal $\dot{\theta}_a$ is then subjected to constant amplification $(k/K_2)$ where $$k = \frac{2\eta}{2\beta}$$

the randome-error slope assumed to be constant and $K_2$ is the constant amplification of the feedback path. FIG. 11 shows this system where the output lead 107 of the rate gyroscope 106 is connected to an amplifier 110 which provides a constant amplification $(k/K_2)$. The output lead 111 of the amplifier 110 is then connected to the summing network 109 which adds the compensating signal $(k\dot{\theta}_a/K_2)$ to the signal $(\dot{\psi}_a/K_2)$ in the feedback loop.

It was shown in FIG. 6 that electronic radome-error compensation could be achieved by inserting a function $(\dot{\eta}_a/K_2)$ into the feedback path by closing the switch $S_2$ and connecting the signal to the summing network 67. It was also shown in conjunction with the description of FIGS. 10 and 11 that this compensating signal may be approximated by supplying to the summing network 67 of FIG. 6 the compensating signal $$\frac{\dot{\theta}_a}{K_2} \quad \frac{2\eta_a}{2\beta_a} \quad \text{or} \quad \frac{\dot{\theta}_a K}{K_2}.$$

It is usually found that these approximations will substantially accomplish electronic radome-error compensation and thereby make the steering signal substantially free of any radome-error. Therefore, it is possible to employ the different means used in conjunction with FIGS. 8, 10 and 11 to generate the electronic radome-error compensating signal. All these compensating signals are proportional to the time-rate of change of the random-error. Since the steering signals are also subjected to the time-rate of change of the radome-error, the methods of generating a compensating signal described in FIGS. 8, 10 and 11 can therefore be used to compensate the steering signals directly.

Figure 12:
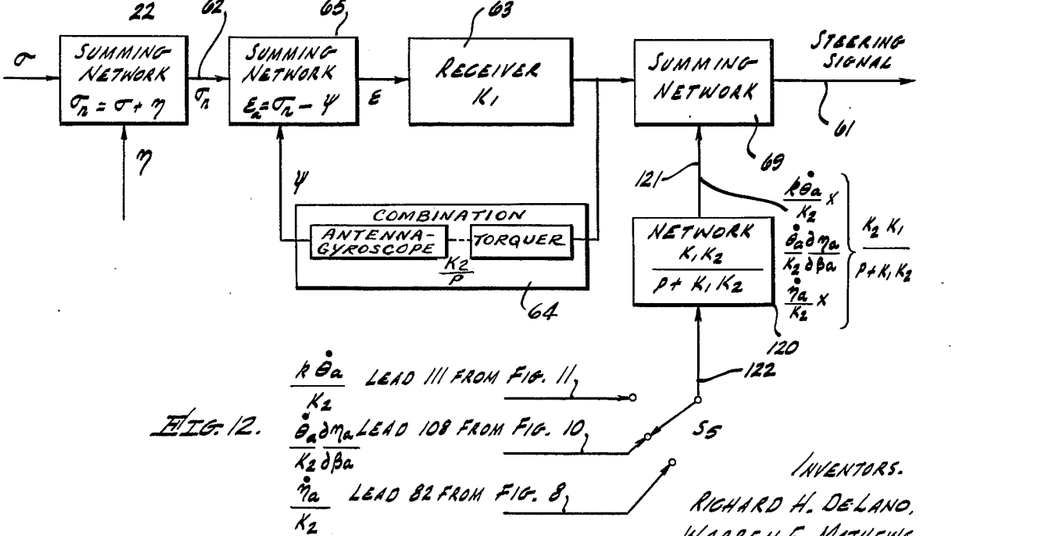

FIG. 12 is a block diagram of another specific embodiment for achieving electronic radome-error compensation by providing for the insertion of the compensating signal directly into the output of the tracking loop as indicated in FIG. 6 by closing the switch $S_4$. The tracking loop shown in FIG. 12 is the same as the one shown and described in conjunction with FIG. 6. The compensation signal necessary to cancel out the radome-error contribution is, as indicated in the description in FIG. 6, equal to $$\frac{K_1 \dot{\eta}_a}{P + K_1 K_2}$$

and must be impressed on the summing network 69 so that it can be subtracted from the steering signal. An electronic network 120 having a transfer function equal to $$\frac{K_1 K_2}{P + K_1 K_2}$$

has its output lead 121 connected to the summing network 69. The network 120 has an input lead 122 on which the compensating signal is impressed. As discussed before, it is possible to effect electronic radome-error compensation by the alternative use of three different compensating signals; namely, $$\frac{\dot{\eta}_a}{K_2} \text{ or } \frac{\dot{\theta}_a}{K_2} \quad \frac{2\eta_a}{2\beta_2} \text{ or } \frac{\theta_a K}{K_2}.$$

For convenience, the systems developing the signals are not shown in detail and the possibility of using either one of the three is indicated by means of a switch $S_5$. These signals can be developed for the system shown in FIG. 12 in exactly the same way as described in conjunction with FIGS. 8, 10 and 11, as indicated in FIG. 12.

In the above description of this invention no attention has been paid to the fact that the radar-controlled guidance system for aircraft must usually provide three-dimensional and not two-dimensional steering signals as shown. However, this invention is just as applicable to a three-dimensional radar-controlled guidance system as it is to a two-dimensional one. In the majority of radar-controlled guidance systems the guidance information is intercepted by the antenna and is resolved into two perpendicular components before leaving the tracking loop, these usually being referred to as the pitch and yaw components. The output of the tracking loop, therefore, consists of a pitch steering signal and a yaw steering signal which serve the purpose of controlling a pair of orthogonally located aerodynamic control surfaces. The invention described above can be applied by individually compensating the pitch and yaw components of the guidance signal in the same fashion as described for a single guidance signal component.

A few examples will illustrate such applications. The embodiment of the invention described in FIG. 3 shows the electronic radome-error compensation being introduced into the electronic system. If the summing network is ahead of the point at which separation into two components occurs, no problem is encountered, since the input to the function generator 34 is also removed from the unresolved signal. If the output of the function generator, however, is applied to the two resolved signals and the input is abstracted from the unresolved signal, it is necessary to add into the output of the function generator 24 a resolver which works in synchronism with the resolver in the electronic system, and two summing networks must be inserted, one for each component.

The embodiment of the invention described in FIG. 7 shows the electronic radome-error compensation applied to the resolved steering signals, if a three-dimensional configuration is considered. If the input to the function generator 34 is also resolved into a pitch and a yaw component as would be obtained from pitch and yaw antenna attitude potentiometers, for example, it will be necessary for the function generator to combine this information, compute the corresponding radome-error, and then resolve the radome-error again into its pitch and yaw components. The same is true for the embodiment of the invention in FIG. 8.

In the embodiment of the invention shown in FIGS. 10, 11 and 12, and assuming that the radome-error derivative ($\delta\eta/\delta\beta$) is constant, no difficulty whatsoever is experienced. The quantity $\dot{\theta}_a$ is taken from two gyroscopes, a pitch rate gyroscope and a yaw rate gyroscope, and inserted directly into the corresponding component signals as shown in the figures.

The invention described above has been illustrated as being generally applicable to radar-controlled systems, and more particularly, to radar-controlled guidance systems for aircraft which are responsive to microwave energy. However, the invention is equally applicable to systems which are responsive to signals located elsewhere in the electromagnetic spectrum. An example of such a system would be an infrared-controlled guidance system for aircraft using electromagnetic waves in the infrared spectral region. Such a system has an optical antenna adapted to receive a beam of infrared energy which is equipped with a protective cover called nirdome. A nirdome as used in this specification is an abbreviation of Near-Infra-Red-Dome signifies a protective antenna cover which is transparent to electromagnetic waves in the infrared spectral region. The optical imperfections of the nirdome covered antenna would again deviate the true line of sight through an error angle to form the apparent line of sight. This error is referred to as the nirdome-error and the angle between the true and the apparent line of sight would be called the nirdome-error angle. Moreover, the radome-error referred to in this specification has been considered as caused mainly by an imperfect radome. However, radome-error as defined in this specification is the angle between the apparent line of sight and the true line of sight and, consequently, no matter what agency is responsible for this deviation of the true line of sight, this invention pertains to the correction of a radar-controlled guidance system for aircraft for the angle between the apparent and the true line of sight.

The system described for inserting electronic radome-error compensation into a guided aircraft has been illustrated with some particular examples applied to a representative form of a radar-controlled guidance system. This invention, however, should in no way be limited to the examples shown since there are a large number of combinations which can achieve the result desired. Any guidance system might have one or more convenient places for inserting electronic radome-error compensation and the actual amount of compensation necessarily depends on the location of the point of insertion. Further, the particular quantity necessary to achieve radome-error compensation in any particular way will determine the particular kind of function generator to be used and the particular kind of approximation which may be made to simplify the compensation system.

What is claimed is:

1. In a radar-controlled system including a radome-covered antenna adapted to receive a radar beam and to develop direction signals in accordance with the direction of said received beam, and an electronic receiver adapted to receive and convert said direction signals derived from said antenna to develop output signals in a predetermined manner, wherein said radome-covered antenna subjects said beam to radome-error, and wherein said radome-error is functionally related to the offset angle of said beam, an electronic radome-error compensating system comprising: means coupled to said radar-controlled system and responsive to said direction signals for developing a signal representative of said offset angle of said beam, a function generator coupled to said means for receiving information indicative of said offset angle, and a compensation input terminal in said radar-controlled system, said function generator being coupled to said input terminal and adapted to generate a compensating signal which is at all times the negative replica of the effective radome-error contribution to said direction signals as related to the position of said input terminal, whereby said compensating signals are added to said direction signals, thereby rendering said output signals substantially independent of said radome-error.

2. In an infrared-controlled system including a nirdome-covered optical antenna adapted to receive an infrared beam and to develop direction signals in accordance with the direction of said received beam, and an electronic receiver adapted to receive and convert said direction signals derived from said antenna to develop output signals in a predetermined manner, and wherein said nirdome-covered antenna subjects said beam to nirdome-error and wherein said nirdome-error is functionally related to the offset angle of said beam, an electronic nirdome-error compensating system comprising: means coupled to said infrared-controlled system and responsive to said direction signals for developing a signal representative of said offset angle of said beam, a function generator coupled to said means for receiving information indicative of said offset angle, and a compensation input terminal in said infrared-controlled system, said function generator being coupled to said input terminal, and adapted to generate a compensating signal which is at all times the negative replica of the effective nirdome-error contribution to said direction signals as related to the position of said input terminal, whereby said compensating signals are added to said direction signals, thereby rendering said output signals substantially independent of said nirdome-error.

3. In a radar-controlled guidance system for aircraft including a radome-covered antenna adapted to receive a radar beam and to develop guidance signals in accordance with the direction of said beam, and an electronic receiver adapted to receive and convert said guidance signals derived from said antenna to develop steering signals in a predetermined manner, and wherein said radome-covered antenna subjects said beam to radome-error and wherein said radome-error is functionally related to the offset angle of said beam, an electronic radome-error compensating system comprising: means coupled to said guidance system and responsive to said guidance signals for developing a signal representative of said offset angle of said beam, a function generator coupled to said means for receiving information indicative of said offset angle, and a compensation input terminal in said guidance system, said function generator being coupled to said input terminal adapted to generate a compensating signal which is at all times the negative replica of the effective radome-error contribution to said guidance signals as related to the position of said input terminal, whereby said compensating signal is added to said guidance signals, thereby rendering said steering signals substantially independent of said radome-error.

4. In an infrared-controlled guidance system for aircraft including a nirdome covered optical antenna adapted to receive an infrared beam and to develop guidance signals in accordance with the direction of said beam, and an electronic receiver adapted to receive and convert said guidance signals derived from said antenna to develop steering signals in a predetermined manner, and wherein said nirdome covered antenna subjects said beam to nirdome-error and wherein said nirdome-error is related to the offset angle of said beam, an electronic nirdome-error compensating system comprising: means coupled to said guidance system and responsive to said guidance signals for developing a signal representative of said offset angle of said beam, a function generator coupled to said means for receiving information indicative of said offset angle, and a compensation input terminal in said guidance system, said function generator being coupled to said input terminal and adapted to generate a compensating signal which is at all times the negative replica of the effective nirdome-error contribution to said guidance signals as related to the position of said input terminal whereby said compensating signal is added to said guidance signals, thereby rendering said steering signals substantially independent of said nirdome-error.

5. In a radar-controlled guidance system for aircraft including a radome-convered antenna adapted to receive a radar beam and to develop guidance signals in accordance with the time-rate of change of the direction of said received beam, and an electronic receiver adapted to receive and convert said guidance signals derived from said antenna to develop steering signals in a predetermined manner the antenna axis being subject to mechanical motion, and wherein said radome-covered antenna subjects said beam to radome-error, and wherein said radome-error is functionally related to the offset angle of said beam, and electronic radome-error compensating system comprising: means coupled to said antenna and responsive to the mechanical motion of the antenna axis for developing a signal representative of said offset angle, a function generator coupled to said means for receiving information indicative of said offset angle, and a compensation input terminal in said guidance system, said function generator being coupled to said input terminal and adapted to compute compensating signals in accordance with said offset angle which are at all times the negative replica of the effective radome-error contribution to said guidance signals related to the position of said input terminal, whereby said compensating signals are added to said guidance signals, thereby rendering said steering signals substantially independent of said radome-error.

6. In an infrared-controlled guidance system for aircraft including a nirdome-covered optical antenna adapted to receive an infrared beam and to develop guidance signals in accordance with the time-rate of change of the direction of said received beam, and an electronic receiver adapted to receive and convert said guidance signals derived from said antenna to develop steering signals in a predetermined manner the antenna axis being subject to mechanical motion, and wherein said nirdome-covered antenna subjects said beam to nirdome-error and wherein said nirdome-error is functionally related to the offset angle of said beam, an electronic nirdome-error compensating system comprising: means coupled to said antenna and responsive to the mechanical motion of antenna axis for developing a signal representative of said offset angle, a function generator coupled to said means for receiving information indicative of said offset angle, and compensation input terminals in said guidance system, said function generator being coupled to said input terminal and adapted to compute compensating signals in accordance with said offset angle which are at all times the negative replica of the effective nirdome-error contribution to said guidance signals related to the position of said input terminals, whereby said compensating signals are added to said guidance signals, thereby rendering said steering signals substantially independent of said nirdome-error.

7. In a radar-controlled guidance system disposed in an airborne frame and including a radome-covered antenna adapted to receive a radar beam and to develop guidance signals in accordance with the time-rate of change of the direction of said beam, and an electronic receiver adapted to receive and convert said guidance signals derived from said antenna to develop steering signals in a predetermined manner, wherein said radome-covered antenna subjects said beam to radome-error, and wherein said radome-error is functionally related to the offset angle of said beam, an electronic radome-error compensating system comprising: means coupled to said guidance system and responsive to said guidance signals for developing a signal representative of said offset angle, a function generator coupled to said means for receiving said signal, a rate gyroscope fastened to said frame whereby said gyroscope is subjected to angular motion of said frame, an electronic multiplier having input means, said function generator and said rate gyroscope being coupled to the input means of said multiplier, a compensating input terminal in said guidance system, said multiplier being coupled to said compensating input terminal, said function generator being adapted to generate a voltage which is substantially equal to the slope of said radome-error at said offset angle, said rate gyroscope being adapted to generate a voltage proportional to the angular velocity of said frame, said multiplier being adapted to receive the voltages from said function generator, and from said rate gyroscope for developing a compensating signal proportional to the product of the voltages supplied thereto, whereby said compensating signal renders said steering signals of said guidance system substantially independent of said radome-error.

8. In a radar-controlled guidance system disposed in an airborne frame and including a radome-covered conically scanning gyroscopic antenna having a scan axis, said antenna being adapted to receive a radar beam and to develop guidance signals in accordance with the direction of said received beam, and a tracking loop having an electronic receiver in the forward path and an antenna-gyroscope-torquer-combination in the feedback path of said tracking loop, where said torquer is mechanically coupled to the antenna-gyroscope to align continuously said scan axis with the direction of said received beam, whereby said feedback path provides integration, said tracking loop being adapted to receive and convert said guidance signal derived from said antenna to develop steering signals proportional to the time-rate of change of direction of said received beam, wherein said radome-covered gyroscopic antenna subjects said beam to radome-error, and wherein said radome-error has a substantially constant slope with respect to the offset angle, an electronic radome-error compensating system comprising: a rate gyroscope fastened to said frame, whereby said rate gyroscope is subjected to the angular motion of said frame, said rate gyroscope being adapted to generate a compensating signal proportional to the angular velocity of said frame, and a compensating input terminal in said feedback path located ahead of said torquer, said rate gyroscope being coupled to said compensating input terminal, said compensating signal being substantially equal in magnitude to the product of the time-rate of change of the direction of said frame, of the slope of said radome-error with respect to said offset angle and of the amplification of said receiver, whereby the introduction of said compensating signal into said compensating terminal renders said steering signals of said guidance system substantially independent of radome-error.

9. In a radar-controlled guidance system disposed in an airborne frame including a radome-covered antenna adapted to receive a radar beam and to develop guidance signals in accordance with the time-rate of change of the direction of said received beam, and an electronic receiver adapted to receive and convert said guidance signals derived from said antenna to develop steering signals in a predetermined manner, wherein said radome-covered antenna subjects said beam to radome-error, and wherein said radome-error is functionally related to the offset angle of said beam, an electronic radome-error compensating system comprising: a rate gyroscope rigidly attached to said frame and subjected to the angular motion of said frame, said rate gyroscope being adapted to generate a compensating signal proportional to the time-rate of change of the angular velocity of said frame, means coupled to said gyroscope and adapted to receive said compensating signal, and a compensating input terminal in said guidance system, said means being coupled to said terminal and being adapted to amplify said compensating signal to be substantially equal to said radome-error contribution in said guidance signals at said terminal, thereby rendering said steering signals of said radar-controlled guidance system substantially independent of said radome-error.

10. In a radar-controlled guidance system disposed in an airborne frame and including a radome-covered conically scanning antenna, the system being adapted to receive a radar beam and to develop guidance signals in accordance with the time-rate of change of the direction of said received beam, and a tracking loop having an electronic receiver in the forward path of said tracking loop, and an antenna-gyroscope-torquer-combination in the feedback path thereof, the torquer of said combination being mechanically coupled to the antenna-gyroscope of said combination to align said scan axis with the direction of said received beam, whereby said feedback path provides integration, said tracking loop being adapted to receive and convert said guidance signal derived from said antenna to develop steering signals proportional to the time-rate of change of direction of said received beam, wherein said radome-covered antenna subjects said received beam to radome-error, and wherein said radome-error is functionally related to the offset angle, an electronic radome-error compensating system comprising: means coupled to said guidance system and responsive to said guidance signals for developing a signal representative of said offset angle, a function generator coupled to said means for receiving information indicative of said offset angle, a rate gyroscope fastened to said frame, whereby said gyroscope is subjected to angular motion of said frame, an electronic multiplier having input means, said function generator and said rate gyroscope being coupled to the input means of said multiplier, and a compensating input terminal in said guidance system, said multiplier being coupled to said input terminal, said function generator being adapted to generate a voltage which is at all times equal to the slope of said radome-error at said offset angle, said rate gyroscope being adapted to generate a voltage proportional to the angular velocity of said frame, said multiplier being adapted to receive the voltages from said function generator and from said rate gyroscope and to develop a compensating signal proportional to the product of the voltages supplied thereto, whereby said compensating signal renders said steering signals of said guidance system substantially independent of said radome-error.

11. In a radar-controlled guidance system disposed in an airborne frame and including a radome-covered conically scanning antenna, the system being adapted to receive a radar beam and to develop guidance signals in accordance with the time-rate of change of the direction of said received beam, a tracking loop having an electronic receiver in the forward path of said tracking loop and an antenna-gyroscope-torquer-combination in the feedback path thereof, the torquer of said combination being mechanically coupled to the antenna-gyroscope of said combination to align said scan axis with the direction of said beam, whereby said feedback path provides integration, said tracking loop being adapted to receive and convert said guidance signal derived from said antenna to develop steering signals proportional to the time-rate of change of direction of said received beam, wherein said radome-covered antenna subjects said received beam to radome-error, and wherein said radome-error is functionally related to the offset angle, an electronic radome-error compensating system comprising: means coupled to said antenna gyroscope and responsive to the angular position of said scan axis for developing a signal representative of the angle between said scan axis and said frame, a function generator coupled to said means for receiving information indicative of said angle and being adapted to generate a voltage which is at all times equal to the product of the time-rate of change of said angle and of the slope of said radome-error at said angle, and a compensating input terminal in said feedback path located ahead of said torquer, said function generator being coupled to said input terminal and providing amplification substantially equal to the reciprocal of the amplification of said feedback path, thereby rendering said steering signals of said radar-controlled guidance system substantially independent of said radome-error.

12. In a radar-controlled guidance system housed in an airborne frame and including a radome-covered conically scanning gyroscopic antenna having a scan axis, said antenna being adapted to receive a radar beam and to develop guidance signals in accordance with the direction of said beam, a tracking loop having an electronic receiver in the forward path of said tracking loop and an antenna-gyroscope-torquer-combination in the feedback path thereof, the torquer of said combination being mechanically coupled to the antenna gyroscope of said combination to align said scan axis with the direction of said received beam, whereby said feedback path provides integration, said electronic system being adapted to receive and convert said guidance signal derived from said antenna to develop steering signals proportional to the time-rate of change of direction of said received beam, wherein said radome-covered antenna subjects said beam to radome-error, and wherein said radome-error has a substantially constant slope with respect to the offset angle, an electronic radome-error compensating system comprising: means coupled to said antenna gyroscope and responsive to the angular position of said scan axis for developing a signal representative of the angle between said scan axis and the axis of said frame, a function generator coupled to said means for receiving said signal, and a compensation input terminal in said guidance system, said function generator being coupled to said compensation input terminal and being adapted to generate a compensating voltage which is at all times the negative replica of the effective radome-error contribution to said guidance signals present at said compensation input terminal to effect substantial compensation of said steering signals for said radome-error, thereby rendering said steering signals independent of said radome-error.

13. In a radar-controlled guidance system housed in an airborne frame and including a radome-covered conically scanning gyroscopic antenna having a scan axis, said antenna being adapted to receive a radar beam and to develop guidance signals in accordance with the direction of said received beam, a tracking loop having an electronic receiver in the forward path of said tracking loop and an antenna-gyroscope-torquer-combination in the feedback path thereof, the torquer of said combination being mechanically coupled to the antenna gyroscope of said combination to align said scan axis with the direction of said received beam, whereby said feedback path provides integration, said electronic system being adapted to receive and convert said guidance signal derived from said antenna to develop steering signals proportional to the time-rate of change of direction of said received beam, wherein said radome-covered antenna subjects said beam to radome-error and wherein said radome-error has a substantially constant slope with respect to the offset angle, an electronic radome-error compensating system comprising: means coupled to said guidance system and responsive to the angular position of said scan axis for developing a signal representative of the angle between said scan axis and the axis of said frame, a function generator coupled to said means for receiving said signal, and a compensation input terminal in said guidance system, said function generator being coupled to said compensation input terminal and being adapted to generate a compensating voltage which is at all times the negative replica of the effective radome-error contribution to said guidance signals present at said compensation input terminal to effect compensation of said steering signals for said radome-error, thereby rendering said steering signals independent of said radome-error.

* * * * *